US008942211B2

(12) United States Patent
Kawakami

(10) Patent No.: US 8,942,211 B2
(45) Date of Patent: Jan. 27, 2015

(54) COMMUNICATION SYSTEM AND COMMUNICATION APPARATUS USING AN NFC WI-FI PROTECTED SETUP TO ESTABLISH A WIRELESS LAN CONNECTION

(75) Inventor: Daisuke Kawakami, Kanagawa (JP)

(73) Assignee: Sony Corporation, Tokyo (JP)

( * ) Notice: Subject to any disclaimer, the term of this patent is extended or adjusted under 35 U.S.C. 154(b) by 1538 days.

(21) Appl. No.: 12/396,821

(22) Filed: Mar. 3, 2009

(65) Prior Publication Data
US 2009/0262716 A1 Oct. 22, 2009

(30) Foreign Application Priority Data

Apr. 16, 2008 (JP) .................... 2008-107308

(51) Int. Cl.
*H04W 4/00* (2009.01)
*H04W 48/20* (2009.01)
*G06Q 20/32* (2012.01)
*H04W 84/18* (2009.01)
*H04W 88/06* (2009.01)
*H04W 88/10* (2009.01)

(52) U.S. Cl.
CPC ........... *H04W 48/20* (2013.01); *G06Q 20/3278* (2013.01); *H04W 84/18* (2013.01); *H04W 88/06* (2013.01); *H04W 88/10* (2013.01)
USPC ........................................................ 370/338

(58) Field of Classification Search
CPC ................. H04W 4/008; H04W 4/24
USPC ........................................................ 370/338
See application file for complete search history.

(56) References Cited

U.S. PATENT DOCUMENTS

| 2005/0043999 | A1* | 2/2005 | Ji et al. ........................ 705/21 |
| 2005/0107089 | A1 | 5/2005 | Fukui |
| 2008/0182512 | A1* | 7/2008 | Waters ...................... 455/41.1 |

FOREIGN PATENT DOCUMENTS

| JP | 2004289619 | 10/2004 |
| JP | 2005117488 | 4/2005 |
| JP | 2005260518 | 9/2005 |
| WO | WO 2007045117 A2 * | 4/2007 | ............. G07B 15/00 |

OTHER PUBLICATIONS

Wi-Fi Protected Setup Specification (Version 10.h Dec. 2006).

* cited by examiner

*Primary Examiner* — Hassan Kizou
*Assistant Examiner* — Ashil Farahmand
(74) *Attorney, Agent, or Firm* — K&L Gates LLP

(57) ABSTRACT

A communication system includes: a service terminal configured to have a wireless LAN access point capability and a proximity communication capability, the wireless LAN access point capability enabling the service terminal to act as a wireless LAN access point to be connected via a network to a service provider providing a network connection service on a chargeable basis, the service terminal thereby offering the chargeable network connection service; and a user terminal configured to have a wireless LAN terminal capability and a proximity communication capability, the wireless LAN terminal capability enabling the user terminal to connect with the wireless LAN access point, the user terminal further connecting to the network using the chargeable network connection service.

15 Claims, 7 Drawing Sheets

FIG.8  THE SERVICE IS NOT AVAILABLE BECAUSE THE BALANCE IS INSUFFICIENT.

FIG.9  THE CONNECTION HAS BEEN SET UP.
YOU ARE NOW REQUESTED TO SETTLE THE SERVICE CHARGE.
PLEASE SELECT YOUR PREFERRED USE TIME.
[¥500 FOR 2 HOURS]  [¥2000 FOR 24 HOURS]  [CANCEL]

FIG.10  THE SERVICE CHARGE HAS BEEN SETTLED. THANK YOU.

FIG.11  THE SERVICE CHARGE HAS NOT BEEN SETTLED. PLEASE TRY THE PROCESS LATER.

FIG.12  PLEASE HOLD YOUR TERMINAL OVER HERE.
SERVICE CHARGES: ¥500 (2 HOURS)
                 ¥2000 (24 HOURS)

FIG.13  THE WIRELESS LAN CONNECTION IS BEING SET UP. PLEASE WAIT...

FIG.14  THE WIRELESS LAN CONNECTION HAS BEEN SET UP.

FIG.15  THE ATTEMPT TO SET UP THE WIRELESS LAN CONNECTION HAS FAILED.

COMMUNICATION SYSTEM AND COMMUNICATION APPARATUS USING AN NFC WI-FI PROTECTED SETUP TO ESTABLISH A WIRELESS LAN CONNECTION

CROSS-REFERENCE TO RELATED APPLICATIONS

The present application claims priority to Japanese Patent Application JP 2008-107308 filed in the Japan Patent Office on Apr. 16, 2008, the entire contents of which is hereby incorporated by reference.

BACKGROUND

Wireless networks have been getting attention as a system that frees people from traditional wired communication systems. Typically, the wireless networks adopt such wireless LAN standards as IEEE (The Institute of Electrical and Electronics Engineers) 802.11a, IEEE 802.11b, and IEEE 802.1g. Wireless LANs enable flexible Internet connections that not only replace the existing wired LANs but also provide Internet access at such public facilities as hotels, airport lounges, train stations, and cafes. By offering such advantages, the wireless LANs have gained widespread acceptance already. It is becoming customary to install wireless LAN capabilities not only in information processing equipment such as personal computers (PCs) but also in CE (consumer electronics) appliances including digital cameras and music players.

Ordinarily, a single unit of equipment serving as a control station called an access point (AP) or a coordinator is set up within an area constituting a wireless LAN, the control station providing overall control on the network. The control station coordinates the access timings of a plurality of terminals on the network, allowing the terminals to operate in synchronized fashion.

Illustratively, NTT Communications Corporation in Japan is offering a public wireless LAN service called Hot Spot (registered trademark). This service permits users' communication terminals to connect with access points set up by Internet service providers in such places as hotels, airport lounges, train stations, and cafes. Thus connected, the terminals allow their users to make use of the Internet in a wireless broadband environment.

For example, a user on the road may use the public wireless LAN service to transmit the data of pictures that he or she took with a digital camera (or a digital camera-equipped mobile phone) to a desired destination or place an order with a printing establishment for having the picture data printed on photographic paper. An imaging apparatus has been proposed (e.g., see Japanese Patent Laid-Open No. 2004-289619, hereinafter referred to as Patent Document 1) which allows the user to prepare order information while not communicating with any wireless LAN communication apparatus and to send desired picture data and the prepared order information to a printing establishment when subsequently moving into a public wireless LAN service area. The proposed apparatus thus allows its user to place an order for picture printing in a steady communication state while the user is on the road.

Where a traditional wireless LAN communication setup is in effect, each communication terminal scans usable nearby networks for the network of a particular Internet service provider to which the terminal subscribes. The network of the ISP has a particular service set identifier (SSID) for identification purposes.

Illustratively, a group of wireless LAN operators called the "Wi-Fi Alliance" has worked out a user authentication program known as Wi-Fi Protected Setup (WPS). This program is designed to facilitate the connection of wireless LAN devices to access points and the establishment of a security setup. As for WPS, see "Wi-Fi Protected Setup Specification (Version 10.h, December 2006)" for example. According to WPS, the apparatus for registering clients is called the registrar. At present, two kinds of methods are provided for authentication: a pushbutton method, and a PIN (personal identification number) code method. With the pushbutton method in effect, a dedicated pushbutton at an access point communicating with the registrar is to be pushed in conjunction with a similarly dedicated pushbutton on a client. The dual operations of the pushbuttons complete the security setup as per ESSID (Extended Service Set Identifier) and WPA2 (Wi-Fi Protected Access 2). Where the PIN code method is in use, on the other hand, each client is to have a previously assigned four-digit or eight-digit number registered with the registrar by way of an apparatus connected to the network of interest. According to the latter method, the client is connected to an access point where the ESSID and WPA2 setups are in effect.

The Wi-Fi Alliance has additionally worked out a so-called NFC (Near Field Communication) setup method whereby a token or a card need only be brought close to suitable equipment for completing the connection setup. NFC is an RFID (radio frequency identification) communication standard for permitting two-way communications over very short distances (e.g., about 10 cm) using a radio wave at 13.56 MHz. As such, NFC was adopted as an international standard "ISO/IEC IS 18092" in December 2003. Today, NFC is utilized extensively in such applications as personal authentication and settlement of electronic payments.

Many of the above-mentioned public LAN services are available on a chargeable basis. This means that each user needs to follow predetermined steps to settle charges when subscribing to the service (i.e., follow the steps to settle the service charge) besides setting up the wireless LAN connection. When settling the service charge, the user generally needs to access the Web page of the selected Internet service provider and input necessary information (e.g., credit card number) or go to the provider's service counter to make payments directly.

FIG. 19 schematically shows a typical structure of a public wireless LAN service. The public wireless LAN environment includes access points and user terminals. Each access point is connected to the Internet service provider (ISP) in question via the network. Each user of the service needs to register beforehand at a service counter of the ISP or at one of its similar outposts and pay the charge. Some ISPs may require the user to establish connection with their wireless LANs before proceeding to follow the above-mentioned steps at their Web pages.

When starting to use the public wireless LAN service, the user thus needs to take a great deal of trouble to set up connection with the wireless LAN through WPS or similar authentication procedures in addition to separately settling the service charge as outlined above. Such bothersome chores can be a substantial impediment to the user's decision to subscribe to the wireless LAN service.

There has been proposed a wireless LAN system (e.g., see Patent Document 1) which, when offering a Hot Spot-based service, identifies clients using identification information such as MAC (media access control) addresses. Upon elapse of a predetermined time period, the proposed system gives a new password solely to each legitimate client for password alteration at short notice in order to prevent illicit access.

However, the proposed wireless LAN system has no capabilities allowing user terminals to settle service charges. Each user must register at a counter of the ISP or at one of its similar outposts and settle the service charge beforehand.

Furthermore, there has been proposed a wireless LAN access system (e.g., see Japanese Patent Laid-Open No. 2005-117488, hereinafter referred to as Patent Document 2) made up of user terminals, a plurality of authentication and billing agency servers, and public wireless LAN Hot Spots. The user terminals each contain a server selection section for selecting one of the authentication and billing agency servers, and a server authentication section for authenticating the selected authentication and billing agency server. Each of the authentication and billing servers includes an agency section for taking over user authentication and billing steps, and a user authentication section for authenticating the users attempting access. The public wireless LAN Hot Spots are capable of connecting the authentication and billing agency servers with the user terminals having successfully undergone both server authentication and user authentication. According to the proposed wireless LAN access system, each user terminal can access secure and extensive networks without resorting to a prepaid scheme. However, the user of each user terminal is apparently required to set up a wireless LAN connection to search for SSID while separately following predetermined steps to select the server. Related techniques are disclosed in Japanese Patent Laid-Open No. 2005-260518.

SUMMARY

The present disclosure relates to a communication system and a communication apparatus for allowing a user terminal to connect with a wireless LAN (local area network) service after completing the steps to gain access to an access point of that service. More particularly, the invention relates to a communication system and a communication apparatus for allowing the user terminal to connect with a wireless LAN service offered at public facilities after completing the steps to settle the charge of the service in question.

The present disclosure is in of the above circumstances and provides a communication system and a communication apparatus for allowing a user terminal to connect properly with a wireless LAN service after following predetermined steps to connect to an access point of that service.

The present disclosure also provides a communication system and a communication apparatus for enabling a user terminal to connect properly with a public wireless LAN service or the like offered at public facilities after following predetermined steps to settle the charge of the service.

The present disclosure further provides a communication system and a communication apparatus for allowing users utilizing a public wireless LAN service or the like to make a wireless LAN setup and to settle the charge of the service easily and securely.

According to one embodiment, there is provided a communication system including: a service terminal configured to have a wireless LAN access point capability and a proximity communication capability, the wireless LAN access point capability enabling the service terminal to act as a wireless LAN access point to be connected via a network to a service provider providing a network connection service on a chargeable basis, the service terminal thereby offering the chargeable network connection service; and a user terminal configured to have a wireless LAN terminal capability and a proximity communication capability, the wireless LAN terminal capability enabling the user terminal to connect with the wireless LAN access point, the user terminal further connecting to the network using the chargeable network connection service.

The term "system" in this specification refers to a logical configuration of a plurality of component devices or a plurality of functional modules for bringing about specific functions. Each of the devices or functional modules may or may not be housed in a single enclosure.

Recent years have witnessed widespread acceptance of public wireless LAN services that allow user terminals to connect to networks via access points set up at public facilities. These connections, however, demand the users to follow predetermined steps to settle the service charge in addition to separately performing the steps to set up a public wireless LAN connection with the service. These troublesome chores may well pose a substantial impediment to the user's decision to subscribe to the wireless LAN service.

The communication system of the present embodiment, by contrast, is suitable for public wireless LAN services and allows the user to make a wireless LAN setup and to settle the service charge securely and easily.

In an embodiment, the communication system includes a service terminal configured to have a wireless LAN access point capability and a proximity communication capability, the wireless LAN access point capability enabling the service terminal to act as a wireless LAN access point to be connected via a network to a service provider providing a network connection service on a chargeable basis, the service terminal thereby offering the chargeable network connection service. The communication system also includes a user terminal owned by a user and configured to have a wireless LAN terminal capability and a proximity communication capability, the wireless LAN terminal capability enabling the user terminal to connect with the wireless LAN access point, the user terminal further connecting to the network using the chargeable network connection service.

That is, the access point offering the chargeable network connection service has the proximity communication (NFC) capability to set up a wireless LAN connection in accordance with the WPS NFC scheme. The access point further allows the service charge to be settled on the network by use of NFC-based electronic money technology.

Preferably, upon authentication with WPS, identification information unique to the wireless LAN terminal capability of the user terminal and identification information of the user terminal for use in charge settlement may be used in combination as identification information of the user terminal. When the combined identification information is exchanged between the access point and the user terminal by use of secure NFC technology, it is possible for the user to minimize the dangers of suffering a man-in-the-middle attack or sustaining leaks of authentication information through WPS technology.

Preferably, upon completion of the wireless LAN connection setup in accordance with the WPS NFC scheme, the service terminal may send the identification information of the user terminal to the service provider. The service provider may receive the identification information of the user terminal and, upon completion of settlement of the service charge, may allow the user terminal to connect to the network within a time limit corresponding to the service charge having been settled.

Preferably, with the wireless LAN connection disconnected, the user terminal may send a connection request over a wireless LAN directly to the service terminal that has the previous wireless LAN connection setup stored therein, without following predetermined steps to set up the wireless LAN connection in accordance with the WPS NFC scheme.

In the case above, the service terminal may send the identification information of the user terminal to the service provider for inquiry. When the time limit corresponding to the service charge having been settled is found yet to expire, the service provider may allow the user terminal to connect to the network within the remaining time limit. If the time limit corresponding to the previously settled service charge is found to have expired, the service provider may allow the user terminal to connect to the network within the remaining time limit reflecting the service charge which is settled thereafter.

The present embodiment thus provides a communication system and a communication apparatus for allowing the user terminal to connect properly to a wireless LAN service after taking steps to connect to an access point of that service.

The present embodiment also provides a communication system and a communication apparatus for permitting the user terminal to connect properly to a public wireless LAN service offered at public facilities after taking steps to settle the service charge.

The present embodiment further provides a communication system and a communication apparatus for enabling the user intent on utilizing a public wireless LAN service to set up a wireless LAN connection and settle the service charge easily and securely.

The communication system of the present embodiment includes access points which provide a network connection service on a chargeable basis and which are each furnished with a proximity communication (NFC) capability to let service charges be settled over a network as outlined above. Each access point is capable of having a wireless LAN connection established according to the WPS NFC scheme. When the identification number unique to each wireless LAN terminal and the identification number for settlement of service charges by the terminal are combined for WPS-based authentication, it is possible for the user to minimize the dangers of suffering a man-in-the-middle attack or sustaining leaks of authentication information through WPS technology.

Implementation of the present embodiment only involve installing noncontact IC reader/writers additionally at the facilities where public wireless LAN services have been made available. The ease of reader/writer installation translates into appreciable savings in labor costs and in the cost of equipment.

Additional features and advantages are described herein, and will be apparent from the following Detailed Description and the figures.

BRIEF DESCRIPTION OF THE FIGURES

Further advantages will become apparent upon a reading of the following description and appended drawings in which:

FIG. 8 is a schematic view of a typical screen displaying an error message telling the user that the wireless LAN connection service is not available because of an insufficient balance;

FIG. 9 is a schematic view of a typical screen which notifies the user of establishment of the wireless LAN connection and which inquires of the user whether or not to settle the service charge;

FIG. 10 is a schematic view of a typical screen displaying a message indicating that the service charge for the wireless LAN connection has been settled;

FIG. 11 is a schematic view of a typical screen displaying an error message indicating that the attempt to settle the service charge for the wireless LAN connection has failed;

FIG. 12 is a schematic view of a typical screen showing details of the wireless LAN connection service;

FIG. 13 is a schematic view of a typical screen displaying a message indicating that the wireless LAN connection is being set up;

FIG. 14 is a schematic view of a typical screen displaying a message indicating that the attempt to set up the wireless LAN connection has succeeded;

FIG. 15 is a schematic view of a typical screen displaying an error message indicating that the attempt to set up the wireless LAN connection has failed;

DETAILED DESCRIPTION

Figure 1:
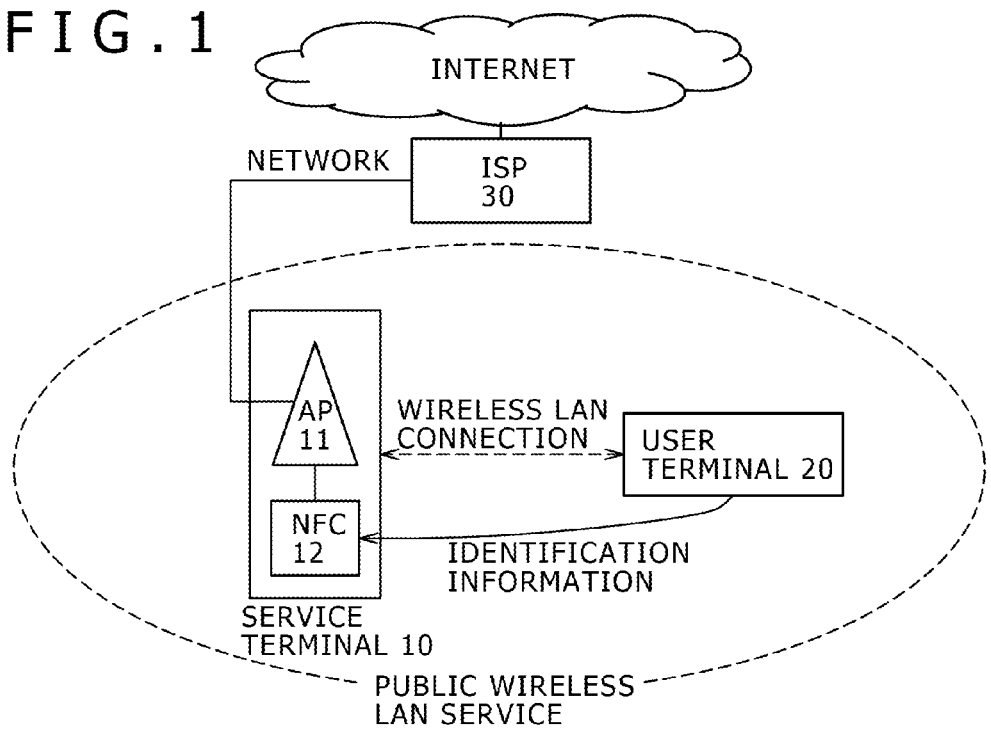
FIG. 1 is a schematic view showing a typical configuration of a public wireless LAN system in an embodiment.
Figure 19:
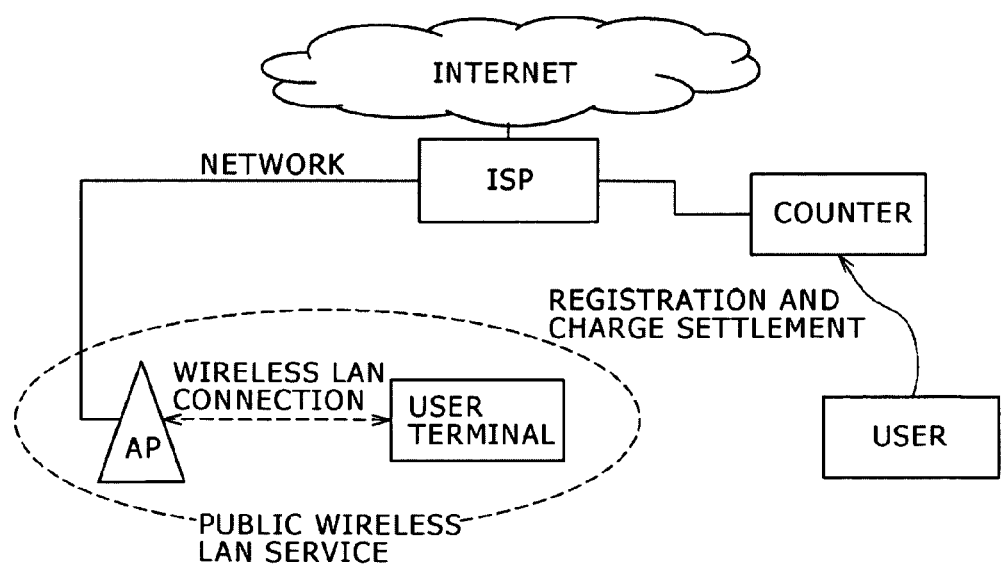
FIG. 19 is a schematic view showing a typical configuration of a traditional public wireless LAN service.

Embodiments will now be described in reference to the accompanying drawings. FIG. 1 schematically shows a typical configuration of a public wireless LAN system practiced as one embodiment. In the public wireless LAN environment of FIG. 1, an access point 11 and a user terminal 20 exist. The access point (AP) 11 is connected to an Internet service provider (ISP) 30 via a network. The difference of the configuration of FIG. 1 from that of FIG. 19 is that an NFC reader/writer (simply called the reader/writer hereunder) is connected to the access point 11. Whereas the reader/writer 12 and access point 11 are typically interconnected by a USB (Universal Serial Bus) cable, the connection may be accomplished by other suitable section for user convenience. In the ensuing description, the access point and the NFC reader/writer will be jointly referred to as the service terminal 10. The service terminal 10 is installed at various public facilities to provide a public wireless LAN service to the user terminals 20.

Figure 2:
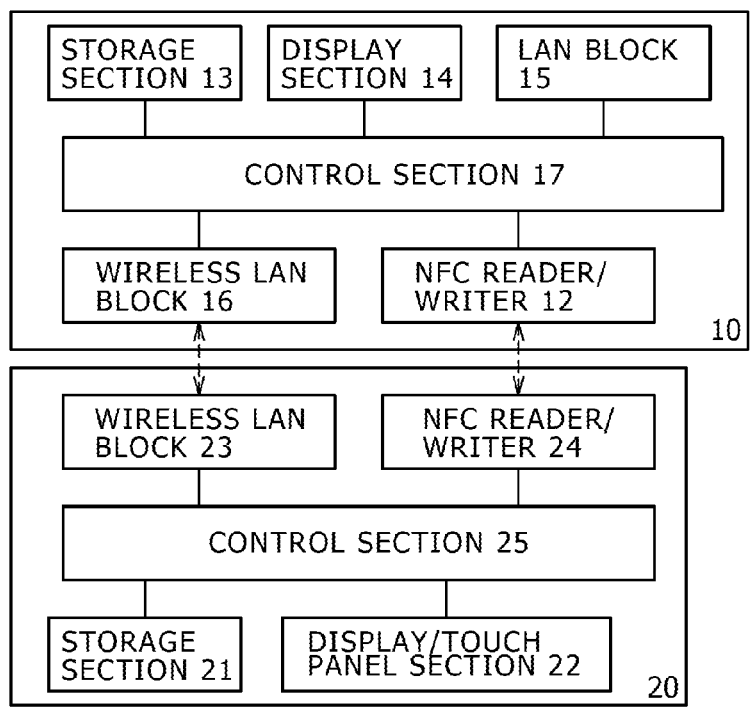
FIG. 2 is a schematic view showing a functional structure of a service terminal and a user terminal of the system in FIG. 1.

FIG. 2 shows a typical functional structure of the service terminal 10 and user terminal 20. The service terminal 10 is made up of a storage section 13 that stores wireless LAN setup information as well as information necessary for settling service charges; a display section 14 that displays status of this terminal 10; a LAN block 15 that communicates with the ISP; a wireless LAN block 16 that functions as an access point communicating with the user terminal 20; the NFC reader/writer 12; and a control section 17 that controls these components.

The LAN block 15 is a functional module that complies illustratively with IEEE 802.3. The wireless LAN block 16 is a functional block illustratively compatible with IEEE 802.11a/b/g/n and functions as an access point. NFC setups come in three types by connection distance: contact type (0 to 2 mm in distance), proximity type (0 to 10 mm), and nearby type (0 to 70 mm). Depending on the type, the NFC reader/writer 12 complies with ISO/IEC 10536, ISO/IEC 14443, or ISO/IEC 15693.

The user terminal 20 is a mobile terminal such as a mobile phone or a notebook PC incorporating wireless LAN and NFC capabilities. The user terminal 20 in FIG. 2 is constituted by a storage section 21 that stores electronic money information and wireless LAN setup information; a display/touch panel section 22 (or an alternative user interface) that accepts user input and displays input and terminal status; a wireless LAN block 23 and an NFC reader/writer block 24 equivalent to their counterparts in the service terminal 10; and a control section 25 that controls these components.

The wireless LAN block 25 is a functional module that complies illustratively with IEEE 802.11a/b/g/n and functions as a communication terminal to be accommodated onto the network of access points. Depending on the type, the NFC reader/writer 24 complies with ISO/IEC 10536, ISO/IEC 14443, or ISO/IEC 15693 as with the NFC reader/writer 12 above.

The Internet service provider 30 is illustratively a host device networked with the service terminal 10 through a LAN interface. The ISP 30 may be constituted by a general-purpose computer and thus will not be discussed further.

In the example of FIG. 2, the authentication program "Wi-Fi Protected Setup (WPS)" provided by the Wi-Fi Alliance is used to set up a wireless LAN connection and security settings easily between the access point capability in the service terminal 10 and the user terminal 20. WPS covers such authentication methods as the pushbutton method, PIN code method, NFC method, and USB method. While setting up the wireless LAN connection using a four-digit or eight-digit number (PIN code method), an eight-digit fixed number "00000000" (pushbutton method), or a randomly generated hexadecimal number (NFC and USB methods) of 16 to 32 bytes, these methods share the same authentication protocol called EAP (Extensible Authentication Protocol)-WPS. With this embodiment, the service terminal 10 and user terminal 20 using their NFC capabilities carry out WPS-based authentication therebetween by resorting to the NFC method.

In the example of FIG. 2, the proximity communication between the service terminal 10 and the user terminal 20 is assumed to be a passive communication between two reader/writers. However, this is not limitative of the present invention. Alternatively, the user terminal 20 may be constituted not by an NFC reader/writer but by a noncontact data carrier (transponder) that allows the NFC reader/writer of the service terminal 10 to write and read data thereto and therefrom.

Traditional public wireless LAN services have required the user to set up the wireless LAN connection through WPS authentication or the like and to settle service charges separately. By contrast, the public wireless LAN service according to this embodiment is designed to let the user set up the wireless LAN connection and settle the service charge easily and securely.

Both the service terminal 10 and the user terminal 20 have NFC communication capabilities. The two terminals serve to let the user settle the charge of the public wireless LAN service using electronic money technology established for NFC. There are two methods for settling the service charge: a network-based method whereby the charge is settled over a network such as a wireless LAN, and an NFC method whereby the charge is settled via a noncontact transmission channel based on NFC. While both settling methods are usable in the communication environment shown in FIG. 2, the ensuing description will focus on how the service is operated through network-based charge settlement.

In this embodiment, the service terminal 10 and user terminal 20 using their NFC capabilities exchange authentication information therebetween in accordance with the WPS NFC scheme and enable the service charge to be settled by utilizing NFC-based electronic money technology. The service terminal 10 acting as an access point can thus associate the user terminal 20 connected via the wireless LAN with the user terminal 20 that settles the service charge. This feature makes it easy for the access point to manage the connected users. The identification information unique to an electronic money terminal is typically made up of eight-byte binary data. The identification information in hexadecimal may be expressed illustratively as "0102030405060708h."

Many of the traditional public wireless LAN services utilize six-byte wireless LAN hardware addresses called MAC (media access control) addresses for connected user identification and utilization time limit management (e.g., see Patent Document 2). Likewise, the service terminal 10 of this embodiment may perform MAC address-based time limit management on the user terminal 20 which connected to the service terminal 10 via a wireless LAN and which has settled the service charge. Illustratively, the time limit management may be carried out using both the MAC address of the user terminal 20 and the terminal identification information of the user terminal 20 necessary for charge settlement in combination as the authentication information to be exchanged in accordance with the WPS NFC scheme.

Suppose that the MAC address is a six-byte hexadecimal number "112233445566" (simply called MAC hereunder) and that the electronic money identification information is an eight-byte hexadecimal number "0102030405060708h" (simply called EID hereunder). In that case, the identification information needed for the WPS NFC scheme can be made available by combining MAC and EID supplemented with two-byte data to constitute 16-byte data (MAC+EID+2 bytes), i.e., "11223344556601020304050607080000h." According to the WPS specifications, the authentication information (Out of Band Device Password) to be exchanged in NFC must have a minimum length of 16 bytes. For this reason, MAC and EID are combined into 14-byte data (MAC+EID) which is further padded with two bytes (0000h) in order to make up 16-byte authentication information.

The combination 16-byte identification information constituted as described above may be exchanged between the service terminal 10 and the user terminal 20 using NFC-based proximity communication technology. This makes it possible for the user to minimize the dangers of suffering a man-in-the-middle attack or sustaining leaks of authentication information through WPS technology. As a result, when making use of a public wireless LAN service, the user can set up the wireless LAN connection and settle the service charge easily and securely.

Figure 3:
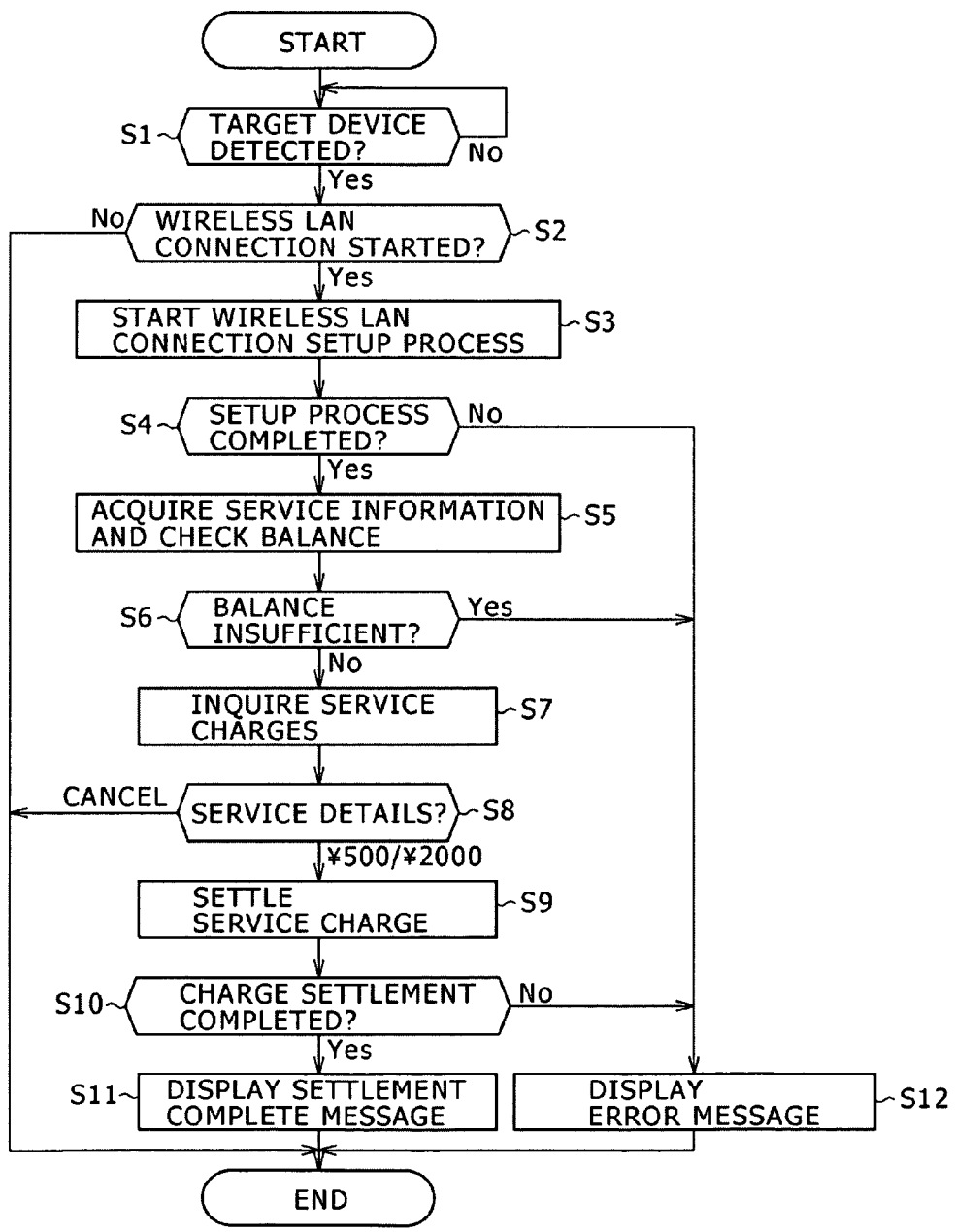
FIG. 3 is a flowchart of steps performed by the user terminal to set up a wireless LAN connection with the service terminal and to settle the charge of the service therewith in the communication environment outlined in FIGS. 1 and 2.

FIG. 3 is a flowchart of steps performed by the user terminal 20 to set up a wireless LAN connection with the service terminal 10 and to settle the service charge therewith in the communication environment outlined in FIGS. 1 and 2. In practice, the steps in FIG. 3 are carried out by the control section 25 executing a suitable processing routine.

The processing routine is started illustratively when the user terminal 20 is turned on or when the user terminal 20 in operation is given the user's instruction (e.g., to start an application that makes use of a public wireless LAN service).

When the processing routine is started, step S1 is repeated until detection is made of an NFC target device (e.g., a reader/write or a setup NFC card of a public wireless LAN service) or until the user terminal 20 is turned off or its relevant application is deactivated.

When the NFC target device is detected ("Yes" in step S1), the user terminal 20 goes to step S2. In step S2, the user terminal 20 sends its own identification information to the detected service device through NFC communication and inquires of the user whether or not to start setting up a wireless LAN connection. The identification information is made up of 16-byte data (MAC+EID+2 bytes) as mentioned above. For inquiry, the display/touch panel section 22 is caused to display an inquiry screen such as one shown in FIG. 6.

Figure 6:
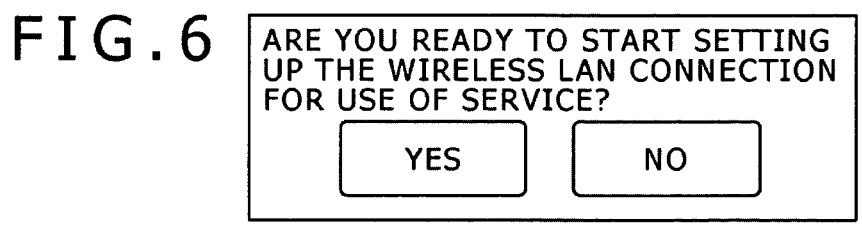
FIG. 6 is a schematic view of a typical screen that inquires of the user whether or not to start setting up a wireless LAN connection.

Through the inquiry screen of FIG. 6, the user may enter "Yes" to give an instruction to start setting up the wireless LAN connection (i.e., "Yes" in step S2). In that case, the user terminal 20 goes to step S3. In step S3, the user terminal 20 notifies the service terminal 10 acting as an access point that the user will start setting up the wireless LAN connection, and proceeds to make the wireless LAN connection setup in accordance with the WPS NFC scheme. If, through the inquiry screen of FIG. 6, the user enters "No" to withhold the instruction to start setting up the wireless LAN connection, then the control section 25 skips all the remaining steps and brings the processing routine to an end.

Figure 7:
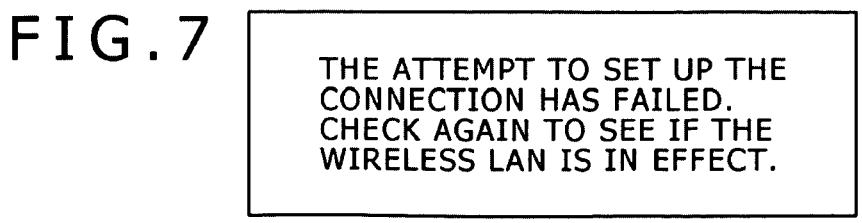
FIG. 7 is a schematic view of a typical screen displaying an error message telling the user that the attempt to set up the wireless LAN connection has failed.

Suppose that an attempt was made to set up the wireless LAN connection but failed ("No" in step S4). In such a case, step S12 is reached. In step S12, the display/touch panel section 22 is caused to display an error message indicating a failure of the attempt to set up the wireless LAN connection. The control section 25 then skips all the remaining steps and terminates the processing routine. FIG. 7 is a schematic view of a typical screen displaying an error message telling the user that the attempt to set up the wireless LAN connection has failed.

When the attempt to set up the wireless LAN connection has succeeded ("Yes" in step S4), step S5 is reached. In step S5, the user terminal 20 notifies the user that the wireless LAN connection setup has been completed. Following the wireless LAN connection setting, also in step S5, the user terminal 20 of this embodiment receives service information through wireless LAN communication and checks to determine whether the balance of the remaining electronic money is sufficient to make use of the wireless LAN connection service. The service information typically specifies the service charge per utilization time unit (e.g., \500 for two hours of use, \2000 for 24 hours of use). The electronic money balance left in the storage section 22 of the user terminal 20 (of this user) is compared with the service charge of the selected utilization time.

If the electronic money balance in the user terminal 20 is insufficient for settling the service charge of any utilization time option ("Yes" in step S6), then step S12 is reached. In step S12, the display/touch panel section 22 is caused to display an error message (see FIG. 8) indicating that the wireless LAN connection service is not available because of an insufficient balance. The control section 25 then skips all the remaining steps and brings the processing routine to an end. Alternatively, in case of the insufficient balance, the wireless LAN service may not be denied immediately. Instead, the user may be prompted to recharge the user terminal 20 with electronic money before the balance is checked again to see if the service is available.

If the user terminal 20 is found to have a sufficient electronic money balance ("No" in step S6), then step S7 is reached and the user is asked to designate the service charge option. FIG. 9 is a schematic view of a typical screen which notifies the user of establishment of the wireless LAN connection and which inquires of the user whether or not to settle the service charge. The screen example of FIG. 9 presents the user with the buttons for three service charge options: \500 to be settled for two hours of use, \2000 for 24 hours of use, or cancellation of the wireless LAN connection service.

If the user selects the Cancel button on the selection screen in FIG. 9, then the control section 25 skips all the remaining steps and terminates the processing routine.

When one of the buttons for setting service charges is selected on the selection screen in FIG. 9, step S9 is reached. In step S9, the selected service charge is settled by subtracting the amount from the electronic money balance left in the user terminal 20. When settlement of the service charge is successfully completed ("Yes" in step S10), step S11 is reached. In step S11, the display/touch panel section 22 is caused to display a message such as one shown in FIG. 10, indicating that the charge for the wireless LAN connection service has been settled. The control section 25 then brings the processing routine to an end. Thereafter, the user terminal 20 is allowed to access the network (i.e., Internet) via the service terminal 10 representing the public wireless LAN service during the utilization time period for which the charge was settled.

It might happen that the attempt to settle the service charge has failed because of the insufficient balance or other reasons ("No" in step S10). If that is the case, the display/touch panel section 22 is caused to display an error message (see FIG. 11) indicating that the attempt to settle the charge for the wireless LAN connection setup has been unsuccessful. The control section 25 then terminates the processing routine. If the balance is found insufficient for the charge option corresponding to the selected button, either the option may be denied, or the user may be asked to recharge the user terminal 20 with electronic money before the balance is checked again to see if the service is available.

Figure 4:
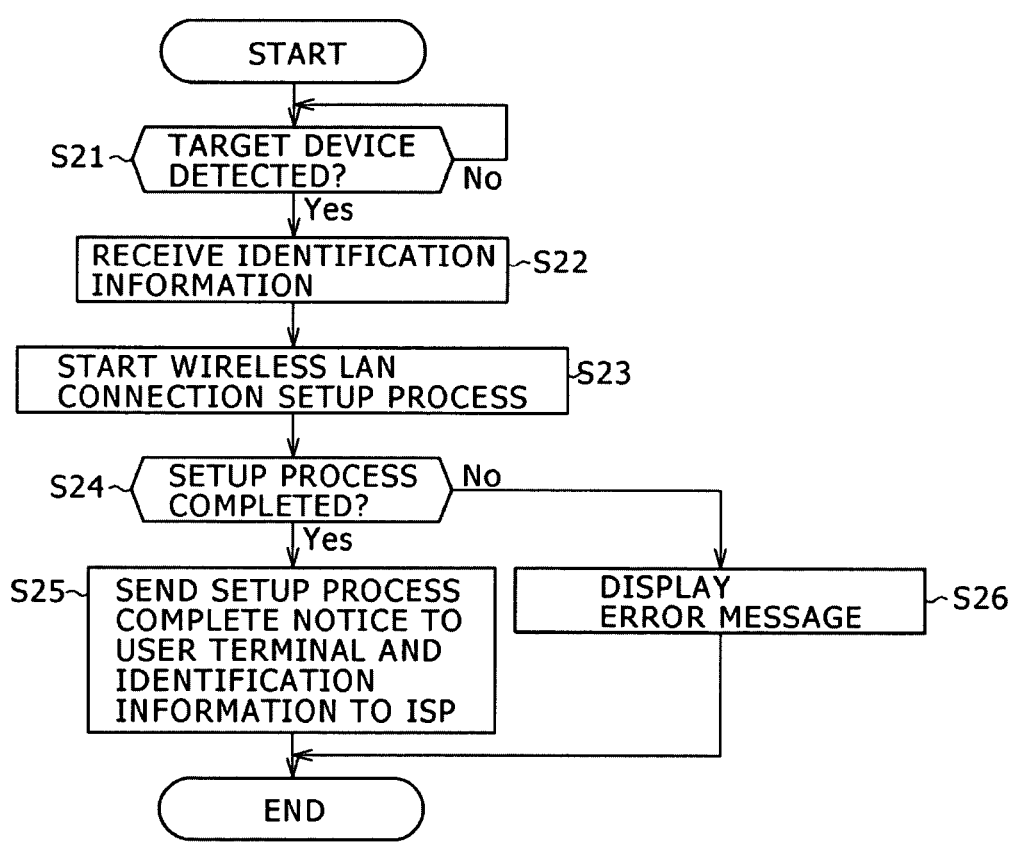
FIG. 4 is a flowchart of steps performed by the service terminal to set up the wireless LAN connection with the user terminal and to settle the service charge therewith in the communication environment outlined in FIGS. 1 and 2.

FIG. 4 is a flowchart of steps performed by the service terminal 10 to set up the wireless LAN connection with the user terminal 20 and to settle the service charge therewith in the communication environment outlined in FIGS. 1 and 2. In practice, the steps in FIG. 4 are carried out by the control section 17 executing a suitable processing routine.

The processing routine is started illustratively when the service terminal 10 is turned on. When the processing routine is started, step S21 is repeated ("No" in step S21) until detection is made of the user terminal 20 as an NFC target device. Illustratively, until the user terminal 20 is detected, the display section 14 may be caused to output a screen showing details of the wireless LAN connection service. FIG. 12 is a schematic view of a typical screen showing details of the wireless LAN connection service. The screen of the example in FIG. 12 gives a message prompting the user to hold his or her user terminal over the service terminal 10 along with indications saying that the charge is \500 for two hours of use of the wireless LAN connection service and \2000 for 24 hours of use.

When the target device is detected ("Yes" in step S21), step S22 is reached. In step S22, the service terminal 10 receives the identification information of the detected device (i.e., user terminal 20) through NFC communication. The identification information is made up of 16-byte data (MAC+EID+2 bytes) as mentioned above.

Also in step S22, the service terminal 10 is notified that the wireless LAN connection has been started (corresponding to step S3 in FIG. 3) by the user terminal 20. In turn, step S23 is reached and the service terminal 10 starts a wireless LAN setup process. Illustratively during the process, the display section 14 may be caused to display a message such as one shown in FIG. 13, on the screen saying that the setup process is currently underway.

When the wireless LAN connection with the user terminal 20 is successfully set up in step S24, the service terminal 10 causes the display section 14 to output on its screen a process complete message such as one shown in FIG. 14. In step S25, the service terminal 10 notifies the Internet service provider 30 of the identification information from the user terminal 20 with which the connection has been set up. The control section 17 then brings the processing routine to an end. Thereafter, the user terminal 20 is allowed to access the network (i.e., Internet) via the service terminal 10 representing the public wireless LAN service during the utilization time period for which the charge was settled.

If the attempt to set up the wireless LAN connection with the user terminal 20 has failed, then the service terminal 10 causes the display section 14 to display on its screen an error message such as one shown in FIG. 15, indicating that the attempt to establish the connection has been unsuccessful. The control section 17 then terminates the processing routine. Since the service terminal 10 needs to keep providing the service continuously, the terminal 10 again starts detecting an NFC target device immediately after termination of the processing routine.

Figure 5:
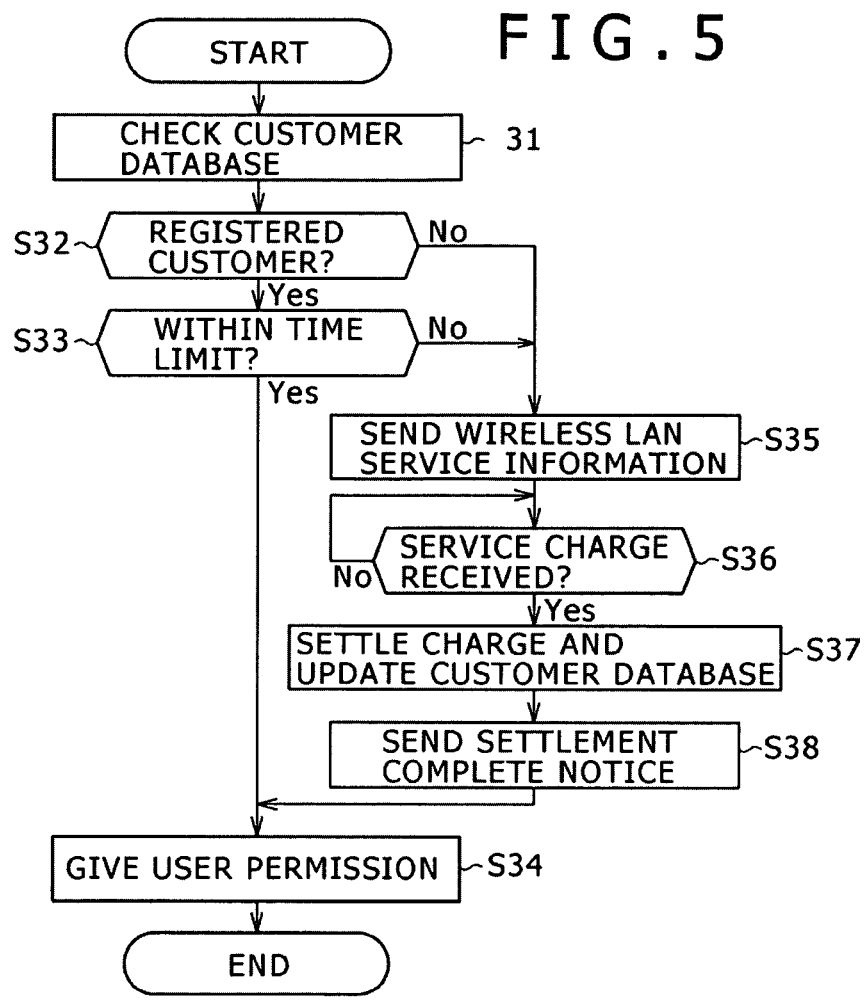
FIG. 5 is a flowchart of steps performed by the Internet service provider in FIG. 1 to set up the wireless LAN connection and settle the service charge between the user terminal and the service terminal in the communication environment outlined in FIGS. 1 and 2.

FIG. 5 is a flowchart of steps constituting a processing routine performed by the Internet service provider 30 to set up the wireless LAN connection and settle the service charge between the user terminal 20 and the service terminal 10 in the communication environment outlined in FIGS. 1 and 2.

It is assumed that the Internet service provider 30 possesses a customer database for managing the identification information about the users subscribing to the wireless LAN connection service provided by this ISP. The identification information on each user is made up of 16-byte data (MAC+EID+2 bytes) as mentioned above.

The Internet service provider 30 starts the processing routine upon receipt from the service terminal 10 of the identification information about the user terminal 20 with which the wireless LAN connection setup has been completed.

In step S31, the Internet service provider 30 checks the customer database to determine whether the information about the customer (i.e., user terminal 20) as part of the received identification information is registered therein.

If the identification information of the user terminal 20 in question is found registered in the customer database ("Yes" in step S32), then step S33 is reached. In step S33, a check is made to determine if the service utilization time requested by the user terminal 20 falls within the time limit for which the service charge was settled. If the requested time period falls within the time period ("Yes" in step S33), then step S34 is reached. In step S34, the Internet service provider 30 notifies the service terminal 10 that the user terminal 20 in question is allowed to make use of the wireless LAN connection service. Thereafter, the user terminal 20 is allowed to access the network (i.e., Internet) via the service terminal 10 representing the public wireless LAN service during the utilization time period for which the charge was settled.

If the identification information of the user terminal 20 is not found registered in the customer database ("No" in step S32) or if the service utilization time requested by the user terminal 20 exceeds the time limit for which the service charge was settled, then step S35 is reached. In step S35 (corresponding to step S5 in FIG. 3), the Internet service provider 30 sends wireless LAN service information to the user terminal 20 via the service terminal 10.

Through the charge settlement screen such as one shown in FIG. 9, the user at the user terminal 20 may settle the service charge using an NFC electronic money capability (corresponding to step S9 in FIG. 3). In that case, the Internet service provider 30 receives the service charge via the service terminal 10 in step S36. Upon receipt of the service charge, the Internet service provider 30 goes to step S37, settles the account of the user terminal 20 in question using the received charge, and updates the customer database so as to reflect the result of the settlement. In step S38, the Internet service provider 30 sends a settlement complete notice to the service terminal 10. Thereafter, the user terminal 20 is allowed to access the network (i.e., Internet) via the service terminal 10 representing the public wireless LAN service during the utilization time period for which the charge was settled.

Figure 16:
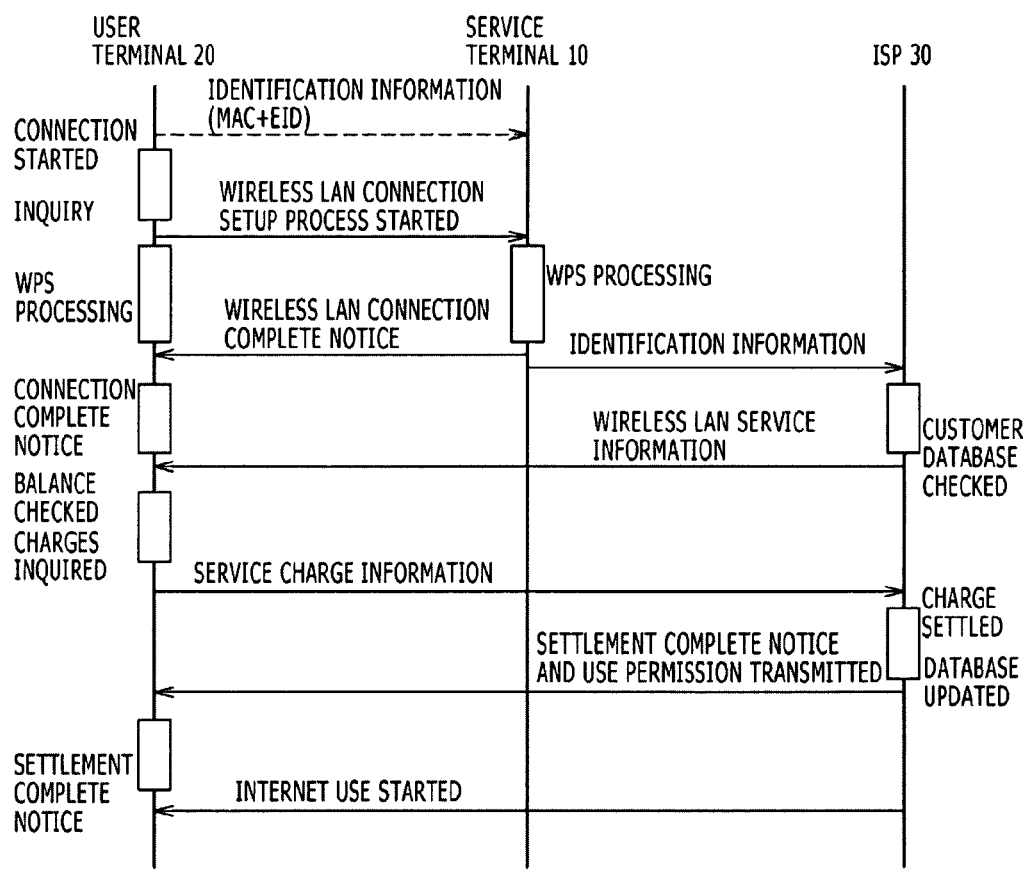
FIG. 16 is a sequence diagram showing how the user terminal, service terminal, and Internet service provider typically communicate with one another when the user terminal makes use of the wireless LAN service for the first time.

FIG. 16 is a sequence diagram showing how the user terminal 20, service terminal (AP) 10, and Internet service provider (ISP) 30 typically communicate with one another when the user terminal 20 makes use of the wireless LAN service for the first time. It is assumed that arrowed solid lines in FIG. 16 stand for wireless LAN communications and arrowed broken lines for NFC communications. Detailed communication steps involved in NFS authentication are standardized and well-known to those skilled in the art and are thus excluded from FIG. 16 for purpose of simplification.

The user terminal 20 intent on starting to use the wireless LAN connection service initially sends identification information including the MAC address and electronic money identification information (EID) of the terminal 20 to the service terminal 10 using the NFC capability. The user terminal 20 proceeds to start setting up the wireless LAN connection and inquires of the service terminal 10 about permission to start the connection. Then a wireless LAN connection setup process based on the WPS NFC scheme is carried out between the user terminal 20 and the service terminal 10 acting as an access point.

Upon completion of the WPS processing, the service terminal 10 notifies the user terminal 20 that the wireless LAN connection has been completed. At the same time, the service terminal 10 forwards the identification information received from the user terminal 20 to the Internet service provider 30.

The Internet service provider 30 checks to determine whether the information on the user terminal 20 included in the received identification information is registered in the customer database. Following the check on customer registration, the Internet service provider 30 sends wireless LAN service information including a charge system of wireless LAN services (e.g., \500 for two hours of use, \2000 for 24 hours of use) to the user terminal 20 via the service terminal 10.

Upon acquiring the service information, the user terminal 20 checks the balance of the electronic money currently left inside and inquires of the user about the preferred charge (i.e., utilization time) option of the wireless LAN service through the inquiry screen such as one shown in FIG. 9. The user-selected service charge is then settled by subtracting the amount from the electronic money balance in the user terminal 20. Information about the settled charge is sent to the Internet service provider 30 via the service terminal 10.

The Internet service provider 30 settles the service charge regarding the user terminal 20 based on the received service charge information, and updates the customer database to reflect the result of the settlement. The Internet service provider 30 then sends a settlement complete notice and service use permission to the user terminal 20 via the service terminal 10. Thereafter, the user terminal 20 is allowed to access the network (i.e., Internet) via the service terminal 10 representing the public wireless LAN service during the utilization time period for which the charge was settled.

Figure 17:
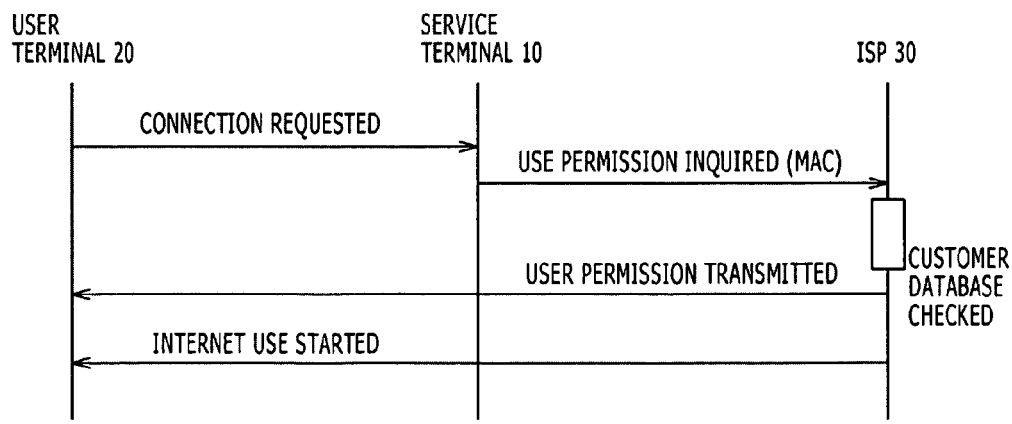
FIG. 17 is a sequence diagram showing how the user terminal, service terminal, and Internet service provider typically communicate with one another when the previously registered user terminal reconnects to the wireless LAN service after settling the service charge again (i.e., connection permitted within the remaining time limit)

FIG. 17 is a sequence diagram showing how the user terminal 20, service terminal (AP) 10, and Internet service provider (ISP) 30 typically communicate with one another when the previously registered user terminal 20 reconnects to the wireless LAN service after settling the service charge again (i.e., connection permitted within the remaining time limit). It is assumed that all arrowed solid lines in FIG. 17 stand for wireless LAN communications. Detailed communication steps involved in NFS authentication are standardized and well-known to those skilled in the art and are thus excluded from FIG. 17 for purpose of simplification.

The user terminal 20 may keep the wireless LAN connection setup with the service terminal 10 stored in the storage section 21. If that is the case, the user terminal 20 sends a connection request directly to the service terminal 10 over the wireless LAN, not through the NFC capability (i.e., without going through the wireless LAN setup process based on the WPS NFC scheme).

Meanwhile, the service terminal 10 can acquire the identification information (MAC) of the user terminal 20 by use of a probe request frame sent from the user terminal 20 and in accordance with ARP (Address Resolution Protocol). In response to the request from the user terminal 20 for connection within the remaining time limit, the service terminal 10 sends to the Internet service provider 30 an inquiry about permission to use the connection service together with the MAC address of the user terminal 20. The probe request is a frame which the terminal uses to carry out active scan for a network (i.e., access point) and which is defined by IEEE 802.11. ARP is a protocol under which a MAC address is obtained from a given IP (Internet protocol) address over a TCP/IP (transmission control protocol/Internet protocol) network.

The Internet service provider 30 checks to determine whether the received MAC address of the user terminal 20 is registered in the customer database. If the user terminal 20 is found registered in the customer database and if the service utilization time for which the charge was settled has yet to expire, then the Internet service provider 30 notifies the user terminal 20 of permission to use the connection service via the service terminal 10.

In the manner described above, the user terminal 20 can make use of the network (i.e., Internet) via the service terminal 10 representing the public wireless LAN service within the remaining utilization time period for which the service charge was settled. If the user terminal 20 does not keep the wireless LAN connection setup with the service terminal 10 stored inside, then the user terminal 20 is required to establish a wireless LAN connection using WPS in accordance with the communication sequence shown in FIG. 16.

Figure 18:
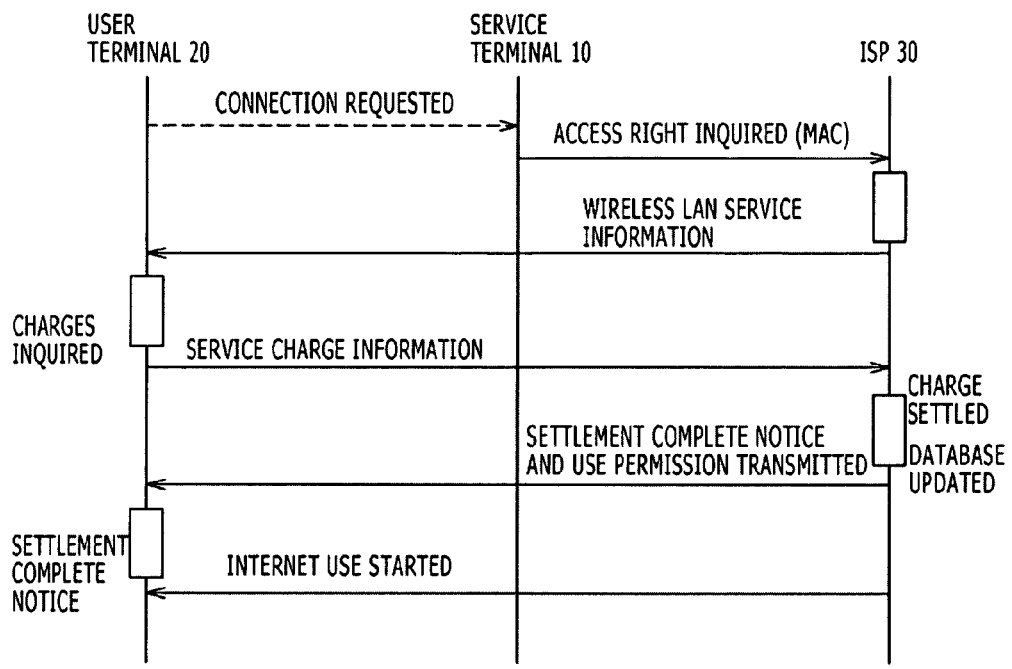
FIG. 18 is a sequence diagram showing how the user terminal, service terminal, and Internet service provider typically communicate with one another when the previously registered user terminal reconnects to the wireless LAN service upon elapse of the remaining time limit.

FIG. 18 is a sequence diagram showing how the user terminal 20, service terminal (AP) 10, and Internet service provider (ISP) 30 typically communicate with one another when the previously registered user terminal 20 reconnects to the wireless LAN service upon elapse of the remaining time limit. It is assumed that all arrowed solid lines in FIG. 18 stand for wireless LAN communications. Detailed communication steps involved in NFS authentication are standardized and well-known to those skilled in the art and are thus excluded from FIG. 18 for purpose of simplification.

As in the communication sequence shown in FIG. 17, the user terminal 20 may keep the wireless LAN connection setup with the service terminal 10 stored in the storage section 21. If that is the case, the user terminal 20 sends a connection request directly to the service terminal 10 over the wireless LAN, not through the NFC capability (i.e., without going through the wireless LAN setup process based on the WPS NFC scheme). In turn, the service terminal 10 inquires of the Internet service provider 30 about the access right of the user terminal 20 as well as the identification information acquired from the user terminal 20.

The Internet service provider 30 checks to determine whether the received MAC address of the user terminal 20 is registered in the customer database. If the user terminal 20 is found registered in the customer database, the Internet service provider 30 further checks to see if there remains any service utilization time period left for which the charge was settled.

It might happen that the user terminal 20 has exhausted the service utilization time allotted thereto. In that case, the Internet service provider 30 sends wireless LAN service information instead of the use permission notice to the user terminal 20 via the service terminal 10.

Upon acquisition of the service information, the user terminal 20 checks the balance of the electronic money left inside. At the same time, through the inquiry screen such as one shown in FIG. 9, the user terminal 20 inquires of the user about the preferred charge (i.e., utilization time) option of the wireless LAN service. The user-selected service charge is then settled by subtracting the amount from the electronic money balance in the user terminal 20. Information about the settled charge is sent to the Internet service provider 30 via the service terminal 10.

The Internet service provider 30 settles the service charge regarding the user terminal 20 based on the received service charge information, and updates the customer database to reflect the result of the settlement. The Internet service provider 30 then sends a settlement complete notice and service use permission to the user terminal 20 via the service terminal 10.

In the manner described above, the user terminal 20 is allowed to access the network (i.e., Internet) via the service terminal 10 representing the public wireless LAN service during the utilization time period for which the charge has been again settled.

Although the foregoing description has focused on the embodiments wherein the user terminal and service terminal are connected using two kinds of communication capabilities, i.e., wireless LAN and NFC proximity communication, this is not limitative of the present invention. Alternatively, the user terminal may be connected over a network to the service provider through setups furnished easily and securely according to the invention and in a manner combining appropriate communication capabilities with electronic money technology.

It should be understood by those skilled in the art that various modifications, combinations, sub-combinations and alterations may occur depending on design requirements and other factor in so far as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A communication system comprising:
a service terminal configured to have a wireless LAN access point capability and a proximity communication capability, said wireless LAN access point capability enabling said service terminal to act as a wireless LAN access point to be connected via a network to a service provider providing a network connection service on a chargeable basis, said service terminal thereby offering the chargeable network connection service; and
a user terminal configured to have a wireless LAN terminal capability and a proximity communication capability, said wireless LAN terminal capability enabling said user terminal to connect with said service terminal, said user terminal further connecting to said network using said chargeable network connection service,
wherein said wireless LAN access point capability of said service terminal and said wireless LAN terminal capability of said user terminal are capable of setting up a wireless LAN connection therebetween in accordance with a Wi-Fi protected setup near field communication scheme by said user terminal transmitting identification information to said service terminal using the proximity communication capability to initiate communication, the identification information including a Media Access Control ("MAC") address of the user terminal that is combined by the user terminal upon authentication with the Wi-Fi protected setup with an electronic identification number ("eID") assigned to the user terminal, wherein the identification information includes two bytes added by the user terminal to the combination of the MAC address with the eID, and
said wireless LAN access point capability and said wireless LAN terminal capability further working together to allow the charge of said network connection service to be settled on said network by said service terminal transmitting the identification information to said service provider.

2. The communication system according to claim 1, wherein the proximity communication capabilities of said service terminal and said user terminal are each capable of conducting proximity communications in accordance with a near field communication scheme; and
the charge of said network connection service to be settled on said network by use of near field communication based electronic money technology.

3. The communication system according to claim 2, wherein, the MAC address is unique to said wireless LAN terminal capability of said user terminal and the eID is used in charge settlement.

4. The communication system according to claim 3, wherein, upon completion of the wireless LAN connection setup in accordance with said Wi-Fi protected setup near field communication scheme, said service terminal sends the identification information of said user terminal to said service provider; and
said service provider receives the identification information of said user terminal and, upon completion of settlement of the service charge, allows said user terminal to connect to said network within a time limit corresponding to the service charge having been settled.

5. The communication system according to claim 4, wherein, with said wireless LAN connection disconnected, said user terminal sends a connection request over a wireless LAN to the service terminal that has wireless LAN connection setup information stored therein, without following predetermined steps to set up said wireless LAN connection in accordance with said Wi-Fi protected setup near field communication scheme;
said service terminal sends the identification information of said user terminal to said service provider; and
said service provider receives the identification information of said user terminal and allows said user terminal to connect to said network while said time limit corresponding to the service charge having been settled has yet to be exhausted.

6. The communication system according to claim 4, wherein, with said wireless LAN connection disconnected, said user terminal sends a connection request over a wireless LAN to the service terminal that has wireless LAN connection setup information stored therein, without following predetermined steps to set up said wireless LAN connection in accordance with said Wi-Fi protected setup near field communication scheme;
said service terminal sends the identification information of said user terminal to said service provider; and
said service provider receives the identification information of said user terminal and, if said time limit corresponding to the previously settled service charge is found exhausted, allows said user terminal to connect to said network within a second time limit corresponding to the service charge which is settled thereafter.

7. A communication apparatus for use as a service terminal of the communication system according to claim 1, said communication apparatus comprising:
network connection means for making a network connection with a service provider offering a network connection service on a chargeable basis;
wireless communication means for acting as an access point of a wireless LAN; and
proximity communication means for conducting proximity communications in accordance with a near field communication scheme;
wherein said communication apparatus uses said proximity communication means to set up a wireless LAN connection with said user terminal in accordance with a Wi-Fi protected setup near field communication scheme and utilizes said wireless communication means and said network connection means to settle the charge of said network connection service by use of near field communication based electronic money technology.

8. The communication apparatus according to claim 7, wherein, upon authentication with regard to said user terminal by use of Wi-Fi protected setup, identification information unique to said wireless LAN terminal capability of said user terminal and identification information of said user terminal for use in charge settlement are used in combination as identification information of said user terminal.

9. The communication apparatus according to claim 8, wherein, upon completion of the wireless LAN connection setup in accordance with said Wi-Fi protected setup and near field communication scheme, said communication apparatus sends the identification information of said user terminal to said service provider.

10. A communication apparatus for use as a user terminal of the communication system according to claim 1, said communication apparatus comprising:
   wireless communication means for acting as a wireless LAN terminal to connect with said service terminal; and
   proximity communication means for conducting proximity communications in accordance with a near field communication scheme;
   wherein said communication apparatus uses said proximity communication means and said service terminal to set up a wireless LAN connection in accordance with a Wi-Fi protected setup near field communication scheme and utilizes said wireless communication means to settle the charge of said network connection service with regard to said service provider by use of near field communication based electronic money technology, said communication apparatus further using said network connection service within a time limit granted by said service provider.

11. The communication apparatus according to claim 10, wherein, upon authentication with regard to said service terminal by use of Wi-Fi protected setup, identification information unique to said wireless LAN terminal capability of said user terminal and identification information of said user terminal for use in charge settlement are used in combination as identification information of said user terminal.

12. The communication apparatus according to claim 10, further comprising:
   storage means for storing the wireless LAN connection setup information with the service terminal with which the wireless LAN connection setup was made previously;
   wherein, with said wireless LAN connection disconnected, said communication apparatus sends a connection request over a wireless LAN to the service terminal that has said wireless LAN connection setup stored therein, without following predetermined steps to set up said wireless LAN connection in accordance with said Wi-Fi protected setup near field communication scheme.

13. A communication apparatus for use as a service terminal of the communication system according to claim 1, said communication apparatus comprising:
   a network connection section configured to make a network connection with a service provider offering a network connection service on a chargeable basis;
   a wireless communication section configured to act as an access point of a wireless LAN; and
   a proximity communication section configured to conduct proximity communications in accordance with a near field communication scheme;
   wherein said communication apparatus uses said proximity communication section to set up a wireless LAN connection with said user terminal in accordance with a Wi-Fi protected setup near field communication scheme and utilizes said wireless communication section and said network connection section to settle the charge of said network connection service by use of near field communication based electronic money technology.

14. A communication apparatus for use as a user terminal of the communication system according to claim 1, said communication apparatus comprising:
   a wireless communication section configured to act as a wireless LAN terminal to connect with said service terminal; and
   a proximity communication section configured to conduct proximity communications in accordance with a near field communication scheme;
   wherein said communication apparatus uses said proximity communication section and said service terminal to set up a wireless LAN connection in accordance with a Wi-Fi protected setup near field communication scheme and utilizes said wireless communication section to settle the charge of said network connection service with regard to said service provider by use of electronic money technology, said communication apparatus further using said network connection service within a time limit granted by said service provider.

15. The communication system according to claim 1, wherein the identification information is a 16-byte hexadecimal number.

* * * * *